J. H. DWORK.
COMBINED AUTOMOBILE BUMPER AND TOOL CARRIER.
APPLICATION FILED NOV. 12, 1919.
1,369,636.
Patented Feb. 22, 1921.
2 SHEETS—SHEET 1.
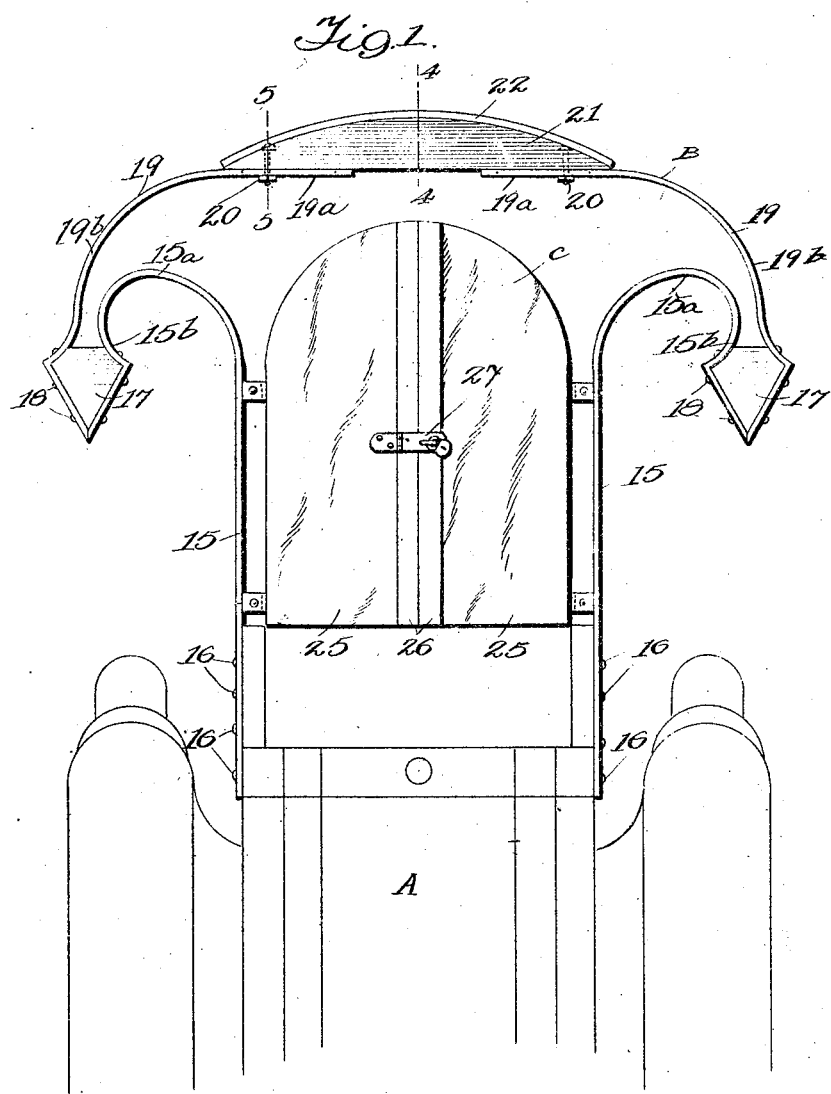
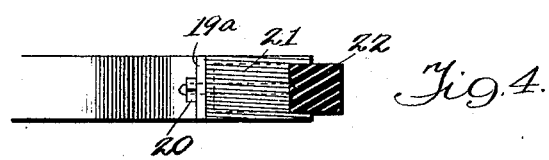
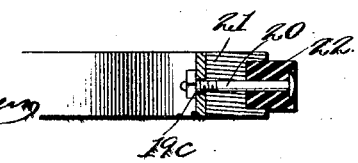
WITNESSES
INVENTOR
JOSEPH H. DWORK,
BY
ATTORNEYS

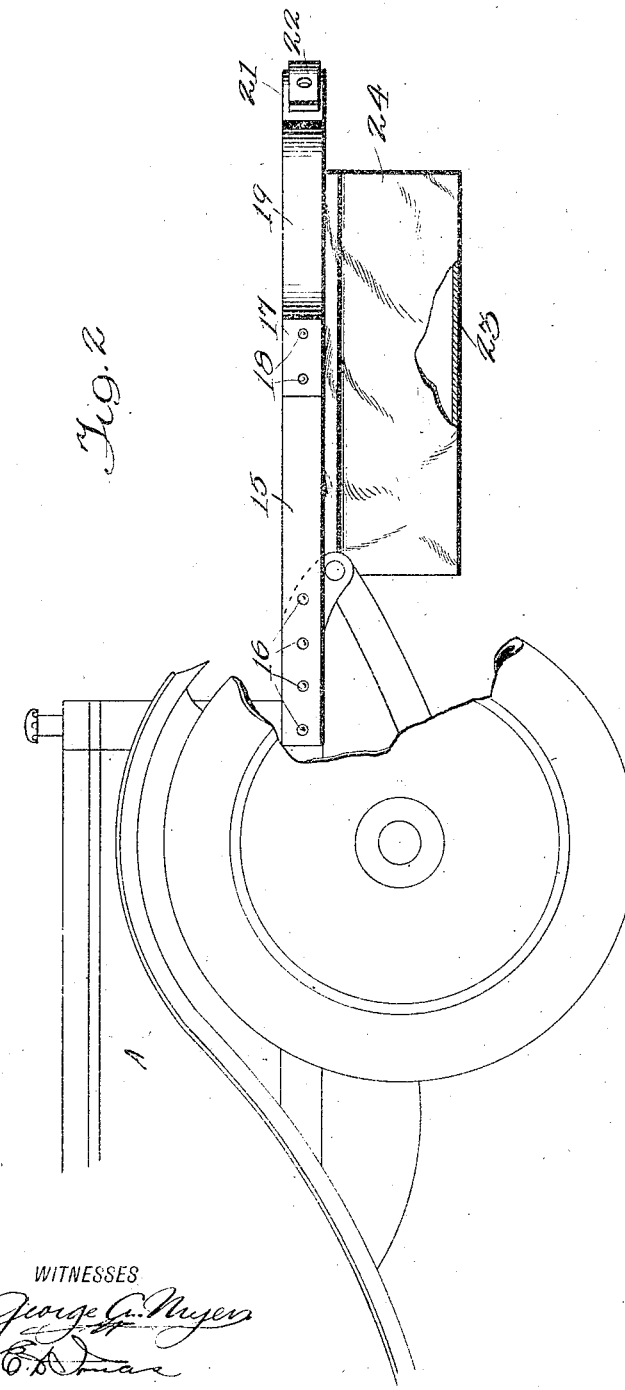

UNITED STATES PATENT OFFICE.

JOSEPH H. DWORK, OF NEWARK, NEW JERSEY.

COMBINED AUTOMOBILE BUMPER AND TOOL-CARRIER.

1,369,636.          Specification of Letters Patent.          Patented Feb. 22, 1921.

Application filed November 12, 1919. Serial No. 337,589.

*To all whom it may concern:*

Be it known that I, JOSEPH H. DWORK, a citizen of the United States, and a resident of Newark, in the county of Essex and State of New Jersey, have invented certain new and useful Improvements in Combined Automobile Bumpers and Tool-Carriers, of which the following is a specification.

My invention relates to bumpers for automobiles, and the purpose of my invention is the provision of a bumper of simple and efficient construction which is adjustable laterally to permit its application to automobiles having chassis of various widths. It is also a purpose of my invention to provide a bumper which is designed to support a receptacle in which tools or the like are adapted to be carried, such receptacle being formed to allow of the lateral adjustment of the bumper so that receptacles of a standard size may be used with the bumper, irrespective of its adjustment.

I will describe one form of bumper and one form of receptacle each embodying my invention, and will then point out the novel features thereof in claims.

In the accompanying drawings:—

Figure 1 is a view, showing in top plan the forward end of a conventional form of automobile, having applied thereto one form of bumper and one form of receptacle each embodying my invention;

Fig. 2 is a view similar to Fig. 1, showing the automobile, bumper and receptacle in side elevation with portions of the automobile and receptacle broken away to reveal certain details of the invention;

Fig. 3 is a view, showing in front elevation the bumper and receptacle in applied position upon an automobile;

Fig. 4 is a sectional view, taken on the line 4—4 of Fig. 1; and

Fig. 5 is a similar view, taken on the line 5—5 of Fig. 1.

Similar reference characters refer to similar parts in each of the several views.

Referring specifically to the drawings, A designates generally an automobile, to the forward ends of the chassis of which is secured a bumper B carrying a receptacle C. The bumper B comprises a pair of resilient members 15, which are secured at their rear ends by means of bolts 16 to the forward ends of the chassis of the automobile. These members 15 are in the present instance formed of flat strips of resilient metal and are arranged in spaced parallel relation to each other with their forward ends curved outwardly in opposite directions, as at 15$^a$, and then rearwardly and inwardly, as at 15$^b$, the latter portion being secured to a block 17 by means of bolts 18. Arranged in spaced relation to the forward ends of the members 15 are resilient members 19 which include linear portions 19$^a$ and rearwardly curved portions 19$^b$. The free ends of the curved portions 19$^b$ are secured to the blocks 17 by means of bolts 18 and as clearly shown in Fig. 1, such blocks are preferably of triangular formation with the ends of the members 15 and 19 bent to snugly engage the edges of these blocks. It is to be understood that blocks of any configuration may be employed, and the members 15 and 19 may be bent to embrace such blocks. The linear portions 19$^a$ are spaced apart at their free ends to permit of the lateral adjustment of the members 19 in one direction or the other. These linear portions 19$^a$ are slotted longitudinally, as at 19$^c$ (Fig. 5) to receive bolts 20 upon which latter is supported a frame 21 carrying a strip of rubber or similar material 22. As illustrated to advantage in Figs. 4 and 5, the frame 21 is substantially U-shaped in cross section to provide a groove in which the strip 22 is seated in such manner that a portion of the strip projects beyond the forward edge of the frame to provide a resilient cushioning surface. As shown in Fig. 5, the bolts 20 extend through the frame 21 and are embedded in the resilient strip 22 so that the latter is securely held within the groove of the frame against accidental displacement. As shown in Fig. 1, the frame 21 is curved at its outer edge in the form of an arc with the resilient strip 22 occupying a corresponding position.

The receptacle C comprises in the present instance a bottom 23 formed of rigid material, side and end walls 24 formed of flexible material such as leather or the like, and a top wall 25 which is formed in two sections connected at their confronting edges by bars 26 which carry a locking member 27 for securing the sections in closed position. As shown in Fig. 1, the receptacle as a unit is supported between the members 15 and in depending relation thereto by means of brackets 27 which are secured to the side walls of the receptacle and the confronting sides of the members 15. The forward end of the receptacle is preferably rounded and arranged in spaced relation to the linear portions 19ª of the members 19, the purpose of this arrangement being to allow of the compression of the members without contacting and injuring the receptacle. When applying the bumper to the chassis of an automobile, lateral adjustment of the same is effected so as to properly fit the particular chassis by loosening the bolts 20, thereby permitting the members 19 to be moved outwardly or inwardly. As the members 15 have a rigid connection with the members 19 it is obvious that by adjusting the latter an adjustment of the former is effected. The receptacle C in no way restricts this lateral adjustment of the bumper because its side walls as well as its top walls are formed of flexible material, and any flexible material such as leather may be stretched sufficiently to allow for this lateral adjustment, it being understood that the transverse dimensions of automobile chassis does not vary to any great extent, so that the necessary adjustment to accommodate the bumper to any chassis is comparatively small.

Although I have here shown and described only one form of bumper and one form of receptacle, each embodying my invention it is to be understood that various changes and modifications may be made herein without departing from the spirit of the invention and the spirit and scope of the appended claims.

Having thus described my invention, I claim:

1. A bumper comprising a pair of spaced resilient members, a second pair of resilient members spaced from the first pair, one of the ends of each pair of members being curved rearwardly, blocks rigidly connecting the said curved ends, and a frame adjustably connected to the other end of the second pair of members for effecting lateral adjustment of the members.

2. A bumper comprising a pair of spaced resilient members, a second pair of resilient members arranged substantially at right angles to the first pair and in advance thereof, one of the ends of one pair of members being curved outwardly and rearwardly in the direction of the first pair of members, a frame spanning the other end of the second pair of members, a cushioning member carried by said frame, and pin and slot connections between said frame and the second pair of members.

3. In combination, a bumper including resilient members, expansible laterally to vary the width of the bumper, and a receptacle carried by the bumper and capable of expanding laterally to allow for the lateral adjustment of the bumper.

4. In combination, a bumper comprising spaced resilient members, a receptacle secured between the members, a second pair of resilient members arranged at substantially right angles to the first pair of members and in advance of said receptacle and said members, and a frame adjustably connecting said second pair of members to permit of lateral adjustment of the bumper, said receptacle being formed of flexible material to allow of the lateral adjustment.

5. In combination, a bumper comprising, spaced resilient members, a second pair of resilient members arranged at substantially right angles to the first pair of resilient members, a frame adjustably connecting the second pair of members to permit of the lateral adjustment of the bumper, and a receptacle carried between the first pair of members and capable of expanding laterally to allow of the lateral adjustment of the bumper.

JOSEPH H. DWORK.